United States Patent
Dale et al.

(10) Patent No.: US 10,317,177 B2
(45) Date of Patent: Jun. 11, 2019

(54) AUTOMATIC DARTBOARD SCORING SYSTEM

(71) Applicant: Flight Path IP Ltd, West Midlands (GB)

(72) Inventors: Jason Dale, Surrey (GB); Stephen Moore, Wimbledon (GB)

(73) Assignee: FLIGHT PATH IP LTD, West Midlands (GB)

(*) Notice: Subject to any disclaimer, the term of this patent is extended or adjusted under 35 U.S.C. 154(b) by 235 days.

(21) Appl. No.: 14/984,585

(22) Filed: Dec. 30, 2015

(65) Prior Publication Data
US 2016/0370155 A1 Dec. 22, 2016

(30) Foreign Application Priority Data
Jun. 18, 2015 (GB) .................................. 1510727.9

(51) Int. Cl.
*F41J 3/02* (2006.01)
*F41J 5/00* (2006.01)
(Continued)

(52) U.S. Cl.
CPC . *F41J 3/02* (2013.01); *F41J 5/00* (2013.01); *G06T 7/73* (2017.01); *H04N 5/2256* (2013.01);
(Continued)

(58) Field of Classification Search
CPC .... F41J 3/02; F41J 5/00; H04N 5/247; H04N 5/2256; G06T 7/73; G06T 2207/10024; G06T 2207/30221
See application file for complete search history.

(56) References Cited

U.S. PATENT DOCUMENTS 5,662,333 A * 9/1997 Allen .......................... F41J 3/00
273/358
8,979,092 B2 * 3/2015 Kim ........................... F41J 3/00
273/374
(Continued)

FOREIGN PATENT DOCUMENTS

DE 202015000225 U1 4/2015
EP 2472466 A2 7/2012
(Continued)

OTHER PUBLICATIONS

Partial PCT Search Report cited in PCT Application No. PCT/GB2016/051441 dated Sep. 22, 2015, 7 pgs.
(Continued)

*Primary Examiner* — Eugene L Kim
*Assistant Examiner* — Jeffrey S Vanderveen
(74) *Attorney, Agent, or Firm* — Cooper Legal Group, LLC

(57) ABSTRACT

A method is disclosed for automatically scoring a game of darts. The method involves obtaining an image of a dartboard (2) using three cameras (10), detecting a visual disturbance in the image, and identifying a validly thrown dart if the visual disturbance includes a moving phase with a maximum temporal duration and successive images of the dartboard which exhibit differences. The visual disturbance should also include a stationary phase when the dart has been embedded in the dartboard (2). The method also includes calculating a score for the validly thrown dart based on its stationary position relative to the dartboard. A lighting system for a dartboard is also disclosed where a LED strip light (14) is provided around a circumference of the dartboard and three spotlights (8) are provided above the dartboard.

12 Claims, 5 Drawing Sheets

(51) Int. Cl.
    *G06T 7/73*     (2017.01)
    *H04N 5/225*     (2006.01)
    *H04N 5/247*     (2006.01)

(52) U.S. Cl.
    CPC ... *H04N 5/247* (2013.01); *G06T 2207/10024* (2013.01); *G06T 2207/30221* (2013.01)

(56) References Cited

U.S. PATENT DOCUMENTS

| | | | |
|---|---|---|---|
| 2005/0023763 A1* | 2/2005 | Richardson | A63B 24/0003 273/348 |
| 2011/0031696 A1* | 2/2011 | Su | F41J 3/00 273/371 |
| 2015/0138330 A1* | 5/2015 | Krishnamoorthi | G06T 7/0016 348/77 |
| 2015/0308793 A1* | 10/2015 | Hong | F41J 3/02 273/371 |

FOREIGN PATENT DOCUMENTS

| | | | | |
|---|---|---|---|---|
| GB | 2418371 A | * | 3/2006 | F41J 3/0019 |
| WO | 87/05688 A1 | | 9/1987 | |

OTHER PUBLICATIONS

Int. Search Report/Written Opinion cited in PCT application No. PCT/GB051441 dated Sep. 12, 2016, 19 pgs.
UK Search Report Cited in Application No. GB1510727.9, dated Aug. 20, 2015, pp. 1-4.

* cited by examiner

AUTOMATIC DARTBOARD SCORING SYSTEM

RELATED APPLICATION

This application claims priority to United Kingdom Patent Application No 1510727.9 Filed on Jun. 18, 2015, which is incorporated herein by reference.

The invention relates to an automatic dartboard scoring system and a system for lighting a dartboard to facilitate accurate scoring.

The game of darts is traditionally played with a bristle dartboard. Each player throws three metal-tipped darts in turn, and can inspect the dartboard to determine their score according to the rules of the game. Scoring is traditionally performed manually using a chalkboard or electronic device such as a smartphone or tablet. Aside from being a chore for the scorer, this slows down gameplay because scoring often cannot keep pace with the player throwing darts.

Some electronic dartboards provide automatic scoring, but these typically use plastic darts that can engage with holes in the board. The look and feel of these electronic dartboards often compares poorly with conventional bristle dartboards which can deter users, especially experienced players.

Automatic scoring systems also exist for bristle dartboards. One example of such a system is described in US 2011/0031696. In this system a pair of cameras is arranged to capture an image of the dartboard from different angles in order to determine the position of a dart on the board. In some systems scoring can be triggered when the cameras detect some difference in sequential images of the dartboard, or if a sound is detected. These systems are vulnerable to interference by players placing darts manually on the board to obtain a false score. In addition, errors can sometimes be introduced by shadowing effects of darts on the board.

An object of the invention is to improve integrity in automatic dartboard scoring so that scores are recorded only for validly thrown darts. Another object of the present invention is to provide an illumination system for a dartboard that facilitates high accuracy automatic scoring.

According to an aspect of the invention there is provided a method for automatically scoring a game of darts, comprising the steps of: obtaining an image of a dartboard; detecting a visual disturbance in the image; identifying a validly thrown dart if the visual disturbance includes a moving phase with predetermined characteristics and a stationary phase; and calculating a score for the validly thrown dart based on its stationary position relative to the dartboard.

In this way, it is possible to verify a valid throw by detecting a moving dart, followed by a stationary dart. This can trigger calculation of a score to ensure that scores are calculated only for validly thrown darts. This advantageously improves the integrity of the automatic scoring system. In particular, this can prevent a player from falsifying a score by placing darts manually on the dartboard, or moving darts that have already been thrown. A score would not be calculated for these darts because they would lack a moving phase with the characteristics of a validly thrown dart.

Preferably the predetermined characteristics of the moving phase include a temporal duration. A validly thrown dart may have a range of possible movements, which depend on throwing style, as it flies from a user's hand, strikes the dartboard, and settles into a final position. Typically, an expected or maximum duration of movement can be established, depending on the length of the dart's in-flight phase which is part of the detected visual disturbance. In one embodiment a validly thrown dart may have a moving phase with a maximum duration of 500 ms. This may include an in-flight phase, and a moving phase while the dart settles into a final position on the dartboard.

A validly thrown dart may be identified if the stationary phase of the visual disturbance has predetermined characteristics. The predetermined characteristics of the stationary and/or moving phase may include physical size and/or colour. Preferably darts are coloured blue so that they contrast with the colours of the dartboard and can be easily detected against that background.

If the visual disturbance lacks a moving phase with predetermined characteristics and a stationary phase then the visual disturbance can be recorded as an invalid dart. Various actions can be taken in response to an invalid dart according to gameplay rules.

The moving phase of the detected visual disturbance may include successive images which exhibit differences. The stationary phase of the visual disturbance may follow the moving phase and include successive images which are substantially identical. Preferably images of the dartboard are captured with a frequency that is high enough to detect movement of a validly thrown dart. The frequency may be at least 5 Hz in some embodiments. In this way, the presence of a moving dart can be inferred, followed by a stationary dart. A validly thrown dart can be identified if the properties of the moving dart and the stationary dart match expected properties. This can improve integrity in scoring because it would be difficult or impossible for a user to mimic the properties of a moving dart, followed by a stationary dart.

The method may include additional steps of: detecting a second visual disturbance in the image; identifying a validly thrown dart if the second visual disturbance includes a moving phase with predetermined characteristics and a stationary phase; and calculating a score for the validly thrown dart based on its stationary position relative to the dartboard. If an invalid dart is identified then play can be advanced in accordance with rules.

If an invalid dart is identified then the method may involve obtaining an image of the dartboard, determining if the image matches an expected image for a clear dartboard, and advancing play in accordance with rules. If a visual disturbance does not correspond to a valid dart then the camera can await a clear dartboard. This may be an indication that a player has removed all of the darts from the dartboard and finished their turn. Thus, play may be advanced so that the next player can throw.

According to an aspect of the present invention there is provided a dartboard lighting system comprising: a first lighting system provided around a substantial circumference of a dartboard for projecting light radially inwards with respect to the dartboard and illuminating any darts thereon; a second lighting system positioned above the dartboard, wherein the second lighting system comprises at least one spot light pointing towards the dartboard for illuminating any darts on the dartboard and for illuminating any darts in moving and stationary phases; and at least one camera for imaging darts in moving and stationary phases on the dartboard.

In this way darts can be illuminated by the at least one spot light while they are moving, and they can be illuminated evenly by a combination of the spot light and the first lighting system when they are on the board. This illumination system can facilitate an accurate and automatic dart detection system, with a camera that can detect darts during their moving phase as well as in their final position on the dartboard.

Preferably the at least one spot light and the at least one camera are provided at a position between the oche and the dartboard. This can allow darts to be illuminated while they are in-flight, without interfering with a player during a throw. Additionally, the camera can be provided in a position that would image validly thrown darts, but would not image players' hands or other external objects. This can facilitate an automatic dart scoring system that can verify validly thrown darts by ensuring that they had a valid in-flight phase.

The at least one spot light and the at least one camera may be provided on an overhead gantry. The gantry may be positioned specifically so that it can light darts in-flight and on the dartboard without interfering with a player during a throw.

The combination of the spot light and the first lighting system is particularly advantageous. It has been found that a ring-shaped light can illuminate darts from all directions. However, some ring-shaped lights may fail to illuminate the centre of the dartboard and the full length of any darts thereon. The spot light can enhance illumination of the centre of the board and the rear of the darts (their flights). However, it has been found that the use of spot lights on their own can introduce undesirable shadowing, which is minimised by the ring-shaped light.

The second lighting system may comprise at least three spot lights, each associated with a camera for imaging darts in-flight and on the dartboard. It has been found that three spot lights can provide even illumination of the darts both in-flight and on the dartboard. In addition, each spot light can provide illumination along the pointing direction of an individual camera. The spot lights can advantageously enhance lighting of the dartboard, especially in the centre of the board, beyond that which is achieved by the first lighting system. Each camera may be attached to the spot light so that they can reliably point in the same direction.

The first lighting system may comprise a ring-shaped light such as an LED strip. It has been found that an LED strip is particularly suitable because it can easily be flexed into a ring and it does not generate excessive heat.

The ring-shaped light may be provided behind a shield to protect it from stray darts. This can also shield light from a thrower's eyes. The ring-shaped light can enhance lighting of the dartboard to improve the accuracy of an automatic scoring system.

The dartboard and the ring-shaped light may be recessed from a planar wall surface. The dartboard can therefore be provided in a circular hole in the planar wall surface. The shield is preferably co-planar or coincident with the wall surface. This can allow effective shielding of the ring-shaped light so that it is properly protected both from stray darts and from player interference.

Preferably the dartboard is bristle-based. However, the techniques and features of the invention may be applied to other types of dartboard as well.

According to another aspect of the invention there is provided an automatic dartboard scoring apparatus comprising: a dartboard; at least one camera configured to obtain an image of the dartboard and to detect a visual disturbance in the image; and a processor configured to identify a validly thrown dart if the visual disturbance includes a moving phase with predetermined characteristics and a stationary phase, and to calculate a score for the validly thrown dart based on its stationary position relative to the dartboard.

Embodiments of the present invention will now be described, by way of example only, with reference to the accompanying drawings in which.

Figure 1:
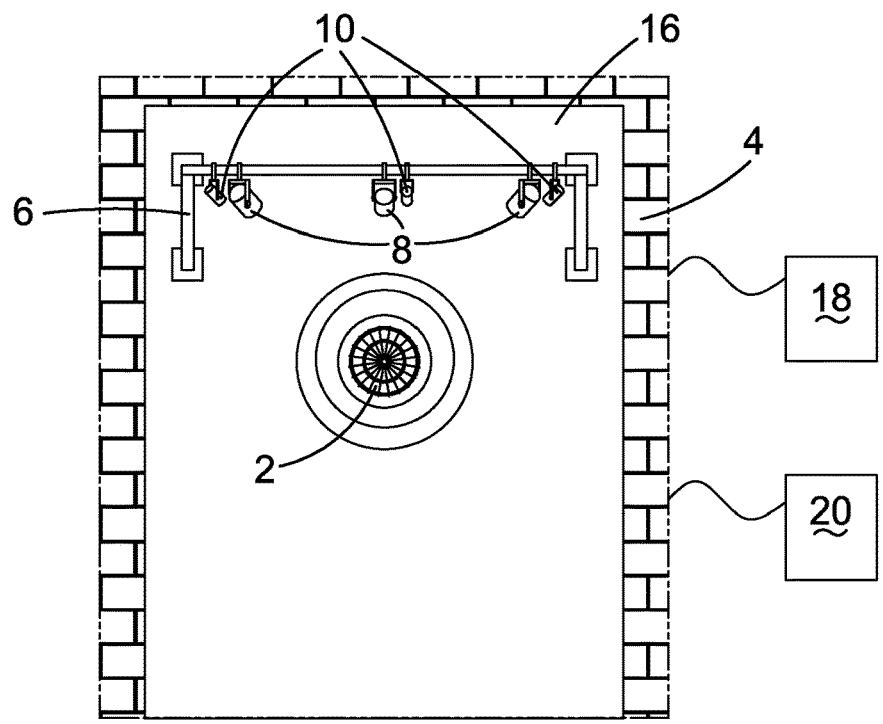
FIG. 1 is a front view of a dartboard lighting system in an embodiment of the present invention.
Figure 2:
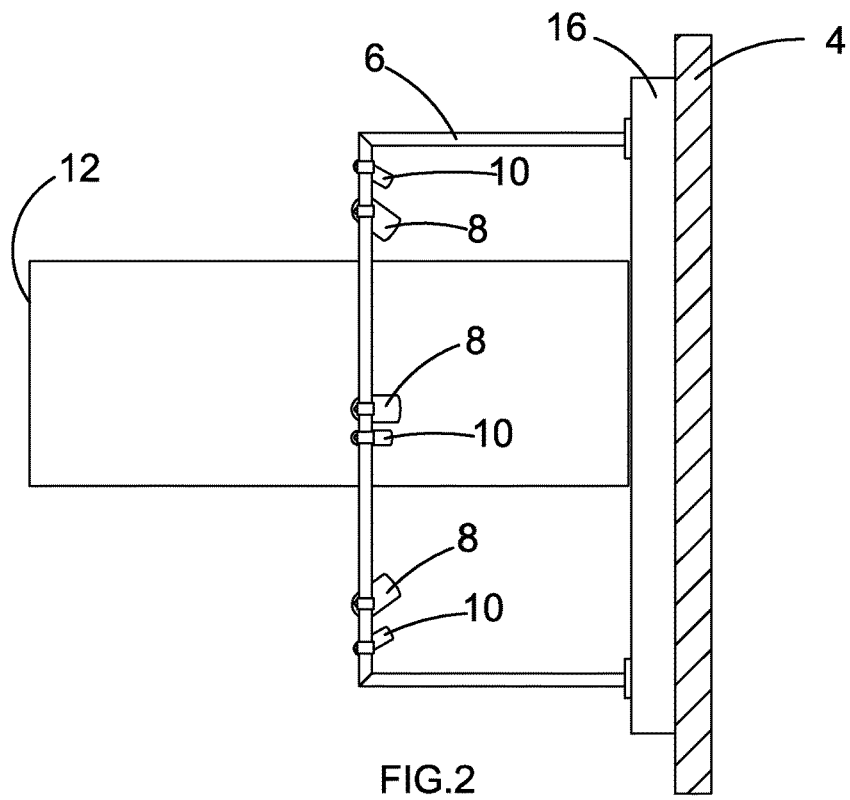
FIG. 2 is a top view of the dartboard lighting system shown in FIG. 1.
Figure 3:
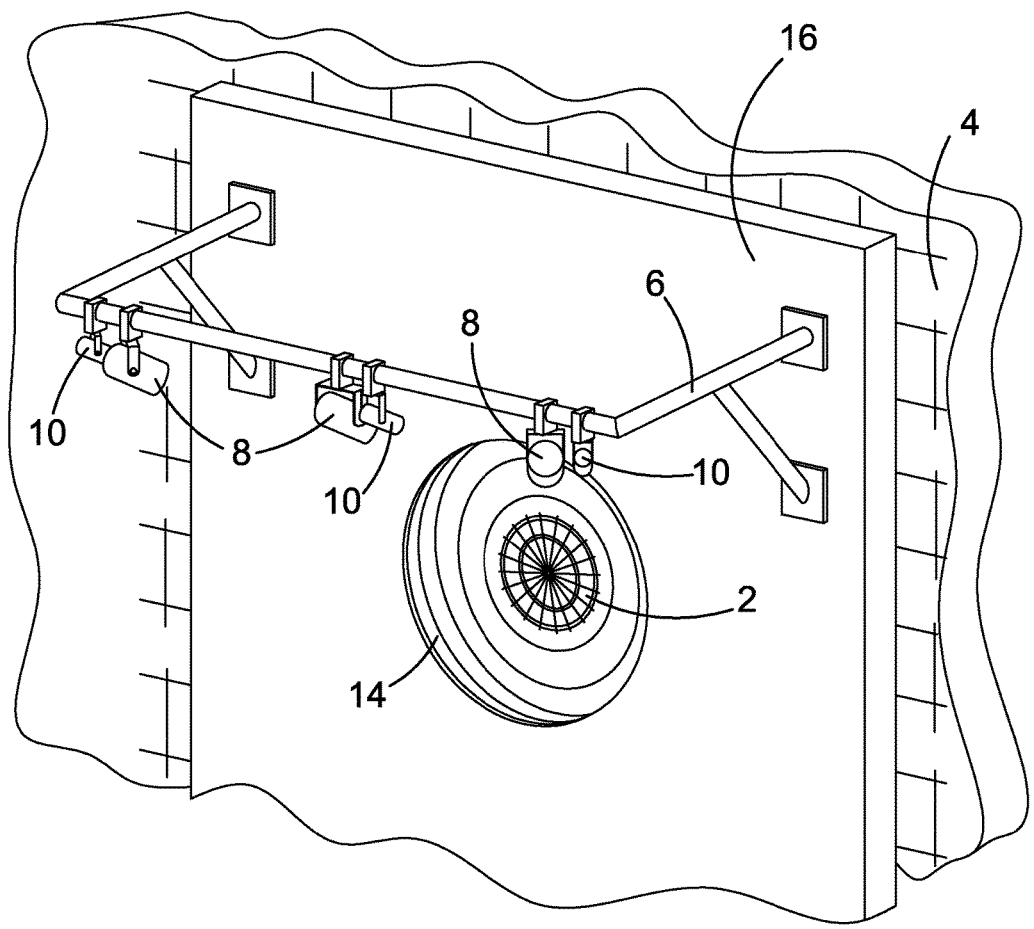
FIG. 3 is a perspective view of the dartboard lighting system shown in FIG. 1.

As shown in FIGS. 1-3, a dartboard 2 is mounted on a wall 4. A gantry 6 is provided above the dartboard 2 which supports three spot lights 8 and three cameras 10, all of which point at the dartboard 2. A computer 18 including one or more processors is connected to the cameras 10 for analysing the results. In addition a Graphic User Interface 20 is connected to the computer 18 for displaying results to players.

An oche 12 (or throwing line) is provided on the floor. The spot lights 8 and the cameras 10 are provided at a position between the oche 12 and the dartboard 2. In some arrangements there may be multiple throwing lines, all of which are provided behind the gantry 6 from the perspective of the dartboard 2.

A LED strip light 14 is provided in a ring around the dartboard 2. The LED strip light 14 is raised above the dartboard 2 to illuminate its surface effectively. The LED strip light 14 can also illuminate any darts on the board. Shadowing effects are minimised because illumination is provided from all sides.

A screen 16 is provided on the wall 4 to cushion darts that miss the dartboard 2. The LED strip light 14 is also shielded by a lip of the screen 16. This prevents damage to the LED strip light 14 by darts. In addition, it shields the LED strip light 14 from a player at the oche 12 to avoid any distraction. The dartboard 2 and the LED strip light 14 are recessed from the screen 16.

The spot lights 8 are provided for illuminating darts that are in-flight between the oche 12 and the dartboard 2. Darts that are in-flight can be imaged by the cameras 10 for a brief period before they strike the dartboard 2 and while they settle into a final position on the dartboard 2. Successful detection of darts having a moving phase can be used as a trigger for determining a score. The spot lights 8 can also improve illumination of the dartboard 2, especially in central areas, so that the cameras 10 can image darts on its surface. The combined illumination of the LED strip light 14 and the spot lights 8 minimises shadowing that could otherwise introduce errors when the position of a dart is determined.

Figure 5:
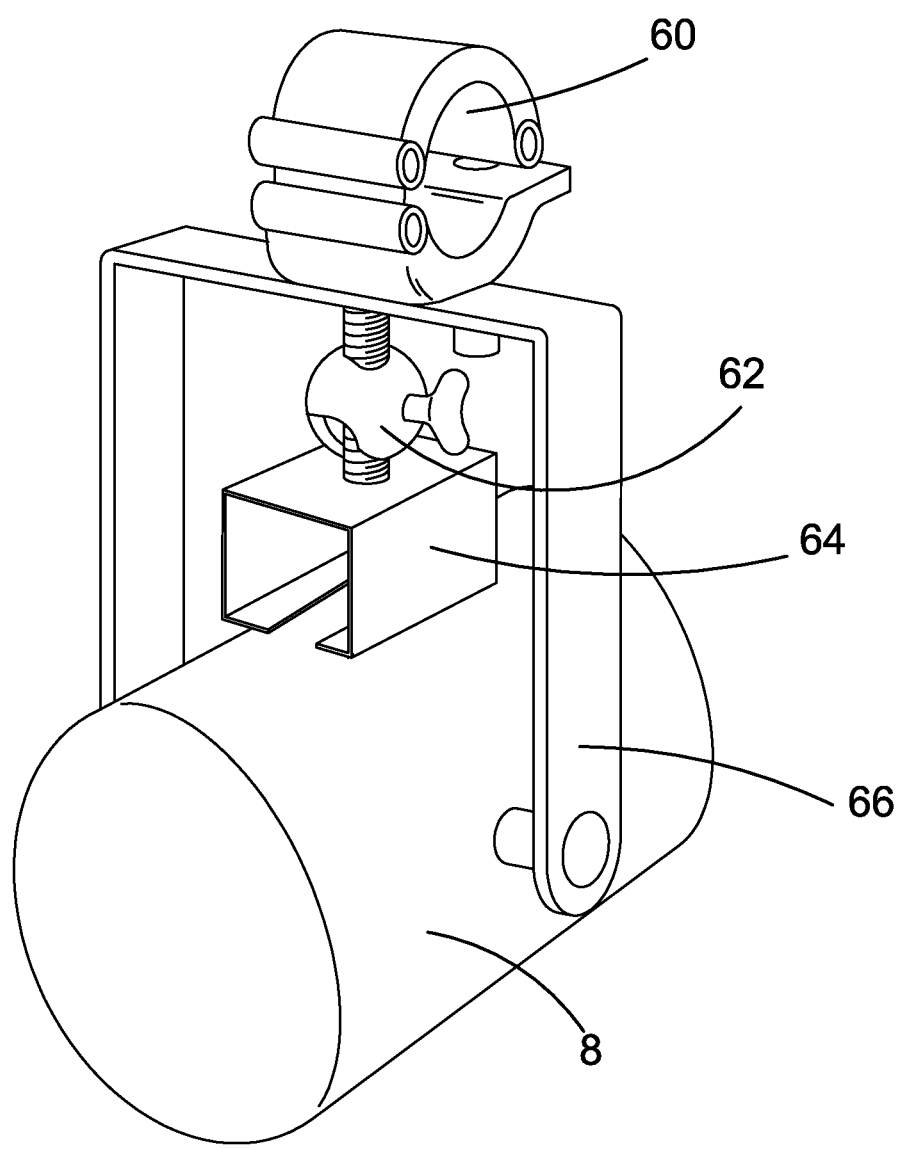
FIG. 5 is a perspective view of a bracket for use in a dartboard lighting system in an embodiment of the invention.

FIG. 5 is a perspective view of a bracket for holding a spot light 8 and a camera 10. A scaffold clamp 60 is provided for attaching the bracket to the gantry 6, and a lockable ball joint 62 is provided on a threaded bar below. A metal camera housing 64 is provided below the ball joint 62 for accommodating a camera 10. A metal swivel joint 64 is provided for supporting a spot light 8. Thus, the camera 10 can be supported above the spot light 8, and both can be arranged to point in substantially the same direction towards the dartboard 2.

Figure 4:
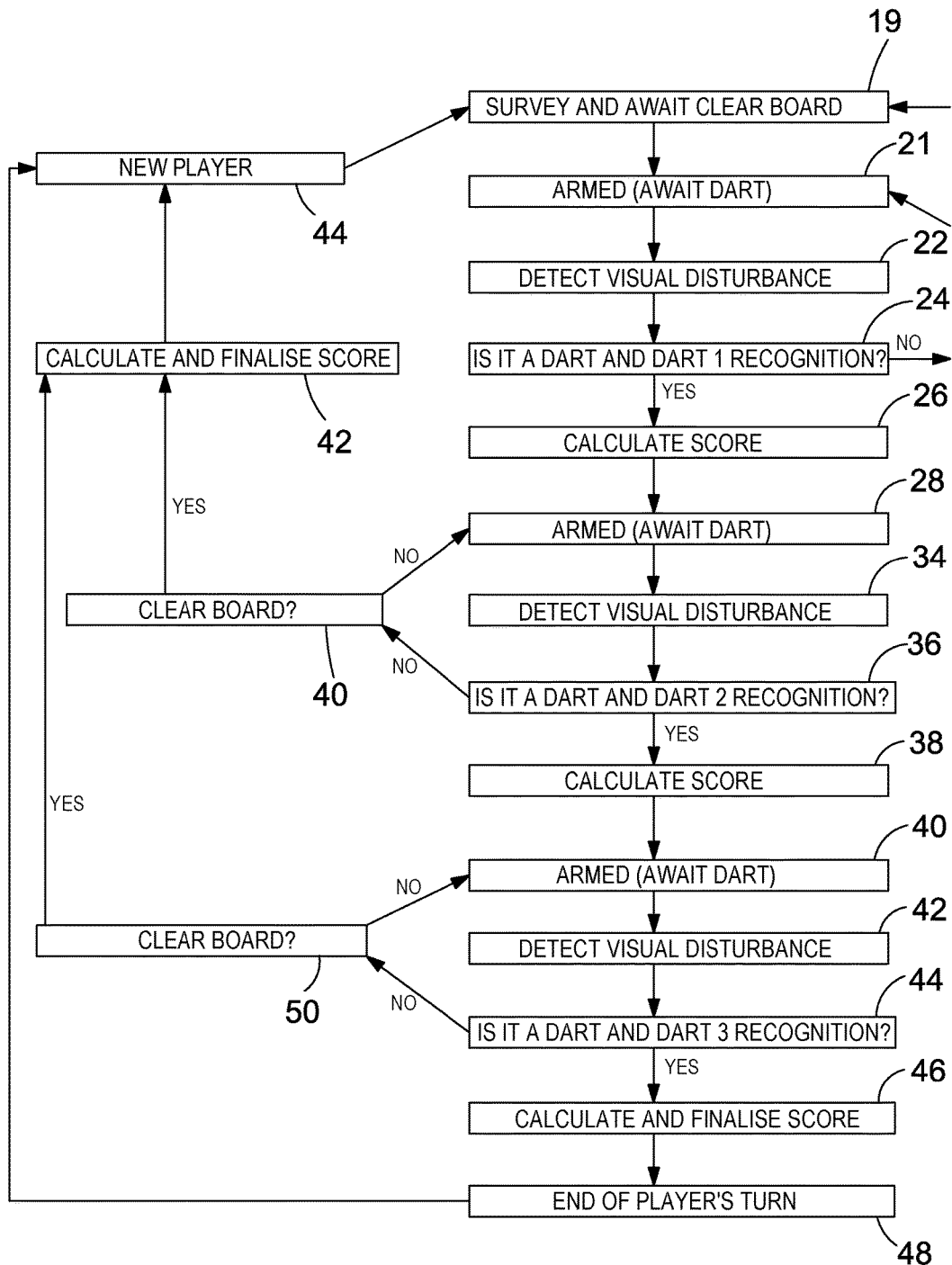
FIG. 4 is a flow diagram showing steps taken in a method of automatically scoring a dartboard, in an embodiment of the invention.
Figure 4:
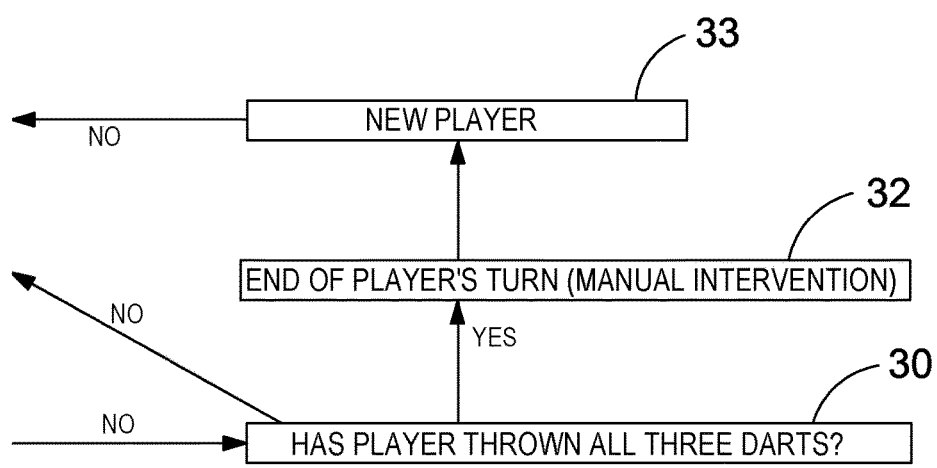

FIG. 4 is a flow diagram showing a sequence of steps undertaken in an automatic scoring system for a game of darts. At step 19 the cameras 10 survey the scene. The cameras 10 capture images with a predetermined frequency, which is at least 5 Hz. The predetermined frequency is selected so that the cameras 10 can obtain images of thrown darts while they are in a moving phase. Images from the cameras 10 are analysed by the computer 18, which awaits a clear dartboard 2. When a clear dartboard 2 is detected the flow chart moves to step 21 at which the system is armed and waiting for a first dart to be thrown.

At step 22 the cameras 10 detect a visual disturbance in the scene. A visual disturbance begins when a minimum pixel difference is detected between successive images of the initially clear dartboard 2. For a validly thrown dart a visual disturbance will normally be initiated when a moving dart is captured in the field of view of (at least one of) the cameras 10. There may be several successive images in which differences are detected from the preceding image, while the dart is in a moving phase. The number of difference images in the moving phase is related to the speed of the thrown dart, the frequency of images from the cameras 10, and the time taken for the dart to settle into a stationary position on the dartboard 2. Once the dart has settled into a stationary position, successive images captured by the cameras 10 will be substantially identical.

At step 24 the computer 18 analyses whether the detected visual disturbance corresponds to a thrown dart. This is achieved by determining whether the visual disturbance includes a moving phase with predetermined characteristics followed by a stationary phase with predetermined characteristics. The moving phase includes a maximum temporal duration, which may be around 500 ms; this is the maximum time anticipated for a validly thrown dart to enter the field of view of the cameras 10 and to settle into a final position. The predetermined characteristics of the stationary phase include an expected physical size, within a range of camera pixels, and an expected colour. In a preferred arrangement the darts are coloured blue so that they can be easily detected against a non-blue background; thus, expected properties for a thrown dart include blue pixels only. A range of expected properties is provided to accommodate different throwing styles.

Darts are illuminated effectively in-flight as they strike the dartboard 2 by the spot lights 8. It has been found that high quality illumination of darts in-flight along the line of sight of the cameras 10 is important for ensuring that the computer 18 can accurately detect the short moving phase of a dart in images captured by the cameras 10.

When a thrown dart is detected at step 24, this is used as a prompt for the computer 18 to calculate a score at step 26. This is achieved by comparing an image of the dartboard 2 immediately before the visual disturbance with an image of the dartboard during the stationary phase of the visual disturbance. Typically such a comparison will reveal image pixels corresponding to the new dart on the dartboard 2. These image pixels can be detected more easily, whatever their position on the dartboard 2, because of the combined illumination of the LED strip light 14 and the spot lights 8.

The cameras 10 are arranged to image the dart from three different perspectives so that the computer 18 can build a three-dimensional model of the dart and dartboard 2. In this way the computer 18 can determine the position of the dart on the dartboard 2 and can calculate a score according to the rules of the game. The calculated score is displayed on the GUI 20, and then the system is armed at step 28, awaiting the second dart.

It is possible that the visual disturbance at step 22 does not match the expected visual disturbance for a thrown dart. For example, the visual disturbance may correspond with some other object being thrown at the board, a player walking up to the dartboard, or any other type of interference. In general the system is designed to ignore these types of interference, and to progress play in accordance with the rules of the game. One possible explanation for a visual disturbance, consistent with normal gameplay, is that a player has walked up from the oche 12 to collect darts that have neither hit the dartboard 2 nor been detected by the cameras 10. Thus, at step 30, the GUI 20 is arranged to ask the player whether they have thrown all three of their darts. If the player responds positively then their turn is ended at step 32 and a new player's turn begins at step 33. In these circumstances the flow chart returns to step 19 to await a clear board. If the player responds negatively then the flow chart returns directly to step 21 where the system is armed, awaiting a dart from the original player.

At step 34 the cameras 10 detect a second visual disturbance, following the first validly thrown dart. At step 36 the computer 18 determines whether the second visual disturbance matches the expected properties of a thrown dart, using the process already described. If a validly thrown dart is detected at step 36 then this is used as a prompt for the computer 18 to calculate a score at step 38. This is achieved by comparing an image of the dartboard 2 immediately before the (second) visual disturbance with an image of the dartboard during the stationary phase of the (second) visual disturbance. Such a comparison can reveal the pixels in the image corresponding to the new dart. It is noted that the position of the first dart would be common to both images so its presence can be ignored. It is noted that this comparison also ignores any re-positioning of previous darts by players since these darts would be in the same relative positions in the before and after comparisons.

The computer 18 can then allocate a score for the new dart using the technique already described and this score can be displayed on the GUI 20. The system is then armed at step 40, awaiting the third dart.

If the second visual disturbance does not correspond to a validly thrown dart at step 36 then the computer analyses at step 42 whether the dartboard 2 is clear. A clear dartboard 2 at this point would suggest that the visual disturbance corresponds to a player walking up to the dartboard and removing the first dart, and possibly one or more stray darts that were not detected by the cameras 10. Thus, a clear dartboard 2 would indicate that a player had finished their turn. The computer 18 then finalises the player's score at step 42 on the basis of the calculated score for the first dart, and gameplay moves forward to a new player at step 44.

If the computer 18 does not detect a clear dartboard 2 at step 40 then it determines that there is some other explanation for the visual disturbance, other than a player removing darts from the dartboard 2. This visual disturbance is ignored and the flowchart returns to step 28 to await the second dart.

At step 42 the cameras 10 detect a third visual disturbance, following the first and second validly thrown darts. At step 44 the computer 18 determines whether the third visual disturbance matches the expected properties of a thrown dart, using the process already described. If a validly thrown dart is detected at step 36 then this is used as a trigger for the computer 18 to calculate a score at step 38. This score can be displayed on the GUI 20. The player's turn is finished at step 48, and the flow chart returns to step 44 so that a new player can begin their turn.

If the third visual disturbance does not correspond to a validly thrown dart at step 44 then the computer analyses at step 50 whether the dartboard 2 is clear. As discussed, a clear dartboard 2 would indicate that a player had finished their turn. The computer 18 then finalises the player's score at step 42 on the basis of the calculated score for the first and second darts, and progresses gameplay to a new player at step 44. If the computer 18 does not detect a clear dartboard 2 at step 50 then the flow chart returns to step 40 to await the third dart.

The method described above is appropriate for use in connection with the standard three-dart game. Alternative methods would readily occur to a person skilled in the art for use in games with involving different numbers of darts.

The invention claimed is:

1. A method for automatically scoring a game of darts, comprising the steps of:
   obtaining a plurality of images of a dartboard;
   detecting a visual disturbance through a comparison of the plurality of images;
   identifying a validly thrown dart if the visual disturbance includes a moving phase with predetermined characteristics and a stationary phase with predetermined characteristics, wherein:
      the moving phase corresponds to a period during which the dart is in-flight and the stationary phase corresponds to a period during which the dart is stationary relative to the dartboard,
      the predetermined characteristics of the moving phase of the visual disturbance includes a minimum pixel difference between successive images of the plurality of images, and
      the predetermined characteristics of at least one of the moving phase or the stationary phase include a feature with a physical size and/or colour; and
   calculating a score for the validly thrown dart based on a stationary position of the dart relative to the dartboard.

2. The method of claim 1 wherein the predetermined characteristics of the moving phase include a maximum temporal duration.

3. The method of claim 1 wherein the predetermined characteristics of the stationary phase of the visual disturbance include successive images of the plurality of images which are identical.

4. The method of claim 1 comprising the steps of:
   obtaining a second plurality of images of the dartboard;
   detecting a second visual disturbance through a comparison of the second plurality of images;
   identifying a second validly thrown dart if the second visual disturbance includes a moving phase with predetermined characteristics and a stationary phase;
   calculating a second score if a second validly thrown dart is identified, based on a stationary position of the second dart relative to the dartboard; and
   advancing play in accordance with rules if an invalid dart is identified.

5. The method of claim 4 wherein if an invalid dart is identified, obtaining an image of the dartboard, determining if the image matches an expected image for a clear dartboard, and advancing play in accordance with rules.

6. The method of claim 1 wherein the moving phase further corresponds to a period during which the dart is settling on the dartboard before becoming stationary relative to the dartboard.

7. The method of claim 1 wherein the step of detecting a visual disturbance in the image includes comparing a first image of the plurality of images to a second image of the plurality of images to identify a difference between the first image and the second image.

8. The method of claim 1 wherein the step of calculating a score for the validly thrown dart includes comparing a first image of the plurality of images captured before the visual disturbance with a second image of the plurality of images captured during the stationary phase.

9. The method of claim 1 comprising the steps of:
   obtaining a second plurality of images of the dartboard;
   detecting a second visual disturbance through a comparison of the second plurality of images;
   determining that the second visual disturbance does not match an expected visual disturbance for a validly thrown dart; and
   displaying a confirmation that a user has completed the user's turn responsive to determining that the second visual disturbance does not match the expected visual disturbance for a validly thrown dart.

10. The method of claim 1 comprising the steps of:
    obtaining a second plurality of images of the dartboard;
    detecting a second visual disturbance through a comparison of the second plurality of images;
    determining that the second visual disturbance does not match an expected visual disturbance for a validly thrown dart; and
    performing an analysis to determine whether the dartboard is clear of darts responsive to determining that the second visual disturbance does not match the expected visual disturbance for a validly thrown dart.

11. An automatic dartboard scoring apparatus comprising:
    a dartboard;
    one or more cameras configured to obtain a plurality of images of the dartboard; and
    a processor configured to:
       detect a visual disturbance through a comparison of the plurality of images,
       identify a validly thrown dart if the visual disturbance includes a moving phase with predetermined characteristics and a stationary phase with predetermined characteristics, wherein:
          the moving phase corresponds to a period during which the dart is in-flight and the stationary phase corresponds to a period during which the dart is stationary relative to the dartboard,
          the predetermined characteristics of the moving phase of the visual disturbance includes a minimum pixel difference between successive images of the plurality of images, and
          the predetermined characteristics of at least one of the moving phase or the stationary phase include a feature with a physical size and/or colour, and
       calculate a score for the validly thrown dart based on a stationary position of the dart relative to the dartboard.

12. The automatic dartboard scoring system of claim 11 further comprising a dartboard lighting system including:
    a first lighting system provided around a circumference of the dartboard for projecting light radially inwards with respect to the dartboard and illuminating any darts thereon; and
    a second lighting system positioned above the dartboard, wherein the second lighting system comprises at least one spot light pointing towards the dartboard for illuminating darts in the moving phase and the stationary phase.

* * * * *